(12) United States Patent
Symes et al.

(10) Patent No.: US 9,378,186 B2
(45) Date of Patent: Jun. 28, 2016

(54) DATA PROCESSING APPARATUS AND METHOD FOR PERFORMING A TRANSFORM BETWEEN SPATIAL AND FREQUENCY DOMAINS WHEN PROCESSING VIDEO DATA

(71) Applicant: ARM LIMITED, Cambridge (GB)

(72) Inventors: Dominic Hugo Symes, Cambridge (GB); Tomas Edso, Lund (SE)

(73) Assignee: ARM Limited, Cambridge (GB)

( * ) Notice: Subject to any disclaimer, the term of this patent is extended or adjusted under 35 U.S.C. 154(b) by 269 days.

(21) Appl. No.: 14/225,473

(22) Filed: Mar. 26, 2014

(65) Prior Publication Data

US 2014/0337396 A1 Nov. 13, 2014

(30) Foreign Application Priority Data

May 7, 2013 (GB) .................................. 1308186.4

(51) Int. Cl.
*G06F 17/14* (2006.01)
*H04N 19/625* (2014.01)
(52) U.S. Cl.
CPC ............ *G06F 17/147* (2013.01); *H04N 19/625* (2014.11)

(58) Field of Classification Search
None
See application file for complete search history.

(56) References Cited

U.S. PATENT DOCUMENTS

| 5,452,466 | A | * | 9/1995 | Fettweis | ................. | G06F 7/762 708/402 |
| 7,730,116 | B2 | * | 6/2010 | Dang | .................... | G06F 17/147 708/402 |
| 8,326,068 | B1 | | 12/2012 | Zhang et al. | | |
| 2011/0060433 | A1 | | 3/2011 | Dai et al. | | |
| 2014/0337396 | A1 | * | 11/2014 | Symes | .................. | G06F 17/147 708/209 |

OTHER PUBLICATIONS

Feig et al., "On the Multiplicative Complexity of Discrete Cosine Transforms", *IEEE Transactions on Information Theory*, vol. 38, No. 4, Jul. 1992, pp. 1387-1391.
Feig et al., "Fast Algorithms for the Discrete Cosine Transformation", *IEEE Transactions on Signal Processing*, vol. 40, No. 9, Sep. 1992, pp. 2174-2193.
Search Report for GB 1308186.4 dated Nov. 19, 2013.

* cited by examiner

*Primary Examiner* — David H Malzahn
(74) *Attorney, Agent, or Firm* — Nixon & Vanderhye P.C.

(57) ABSTRACT

A data processing apparatus and method are provided for performing a transform between spatial and frequency domains when processing video data. The data processing apparatus comprises transform circuitry configured to receive N input values and to perform a sequence of operations to generate N output values representing the transform of the N input values between the spatial and frequency domains. In doing this, the transform circuitry employs a base circuitry that is configured to receive M internal input values generated by the transform circuitry, where M is greater than or equal to 4, and to perform a base operation equivalent to matrix multiplication of the M internal input values by a Hankel matrix, which is a square matrix with constant skew diagonals, where each element of the array identifies a coefficient, performance of the base operation generating M internal output values for returning to the transform circuitry. The transform circuitry is arranged during performance of the sequence of operations to generate from the N input values multiple sets of the M internal input values, to provide each set of M internal input values to the base circuitry in order to cause multiple sets of the M internal output values to be produced, and to derive the N output values from the multiple sets of M internal output values. It has been found that such an approach is scalable to accommodate varying sizes of N, results in a significant reduction in the number of multiplications required in order to perform the transform between the spatial and frequency domains of the N input values, and produces a bit exact result.

23 Claims, 8 Drawing Sheets

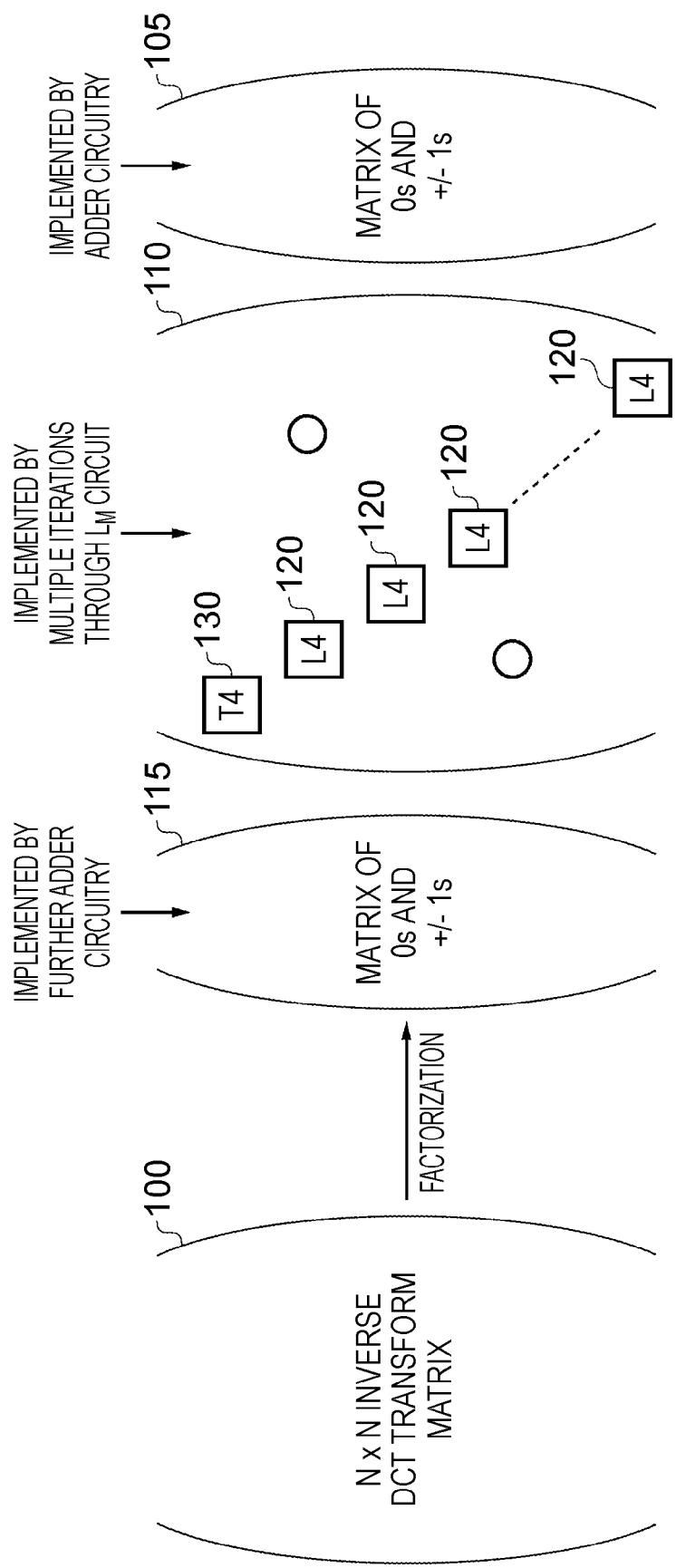
FIG. 3A (inverse transform)

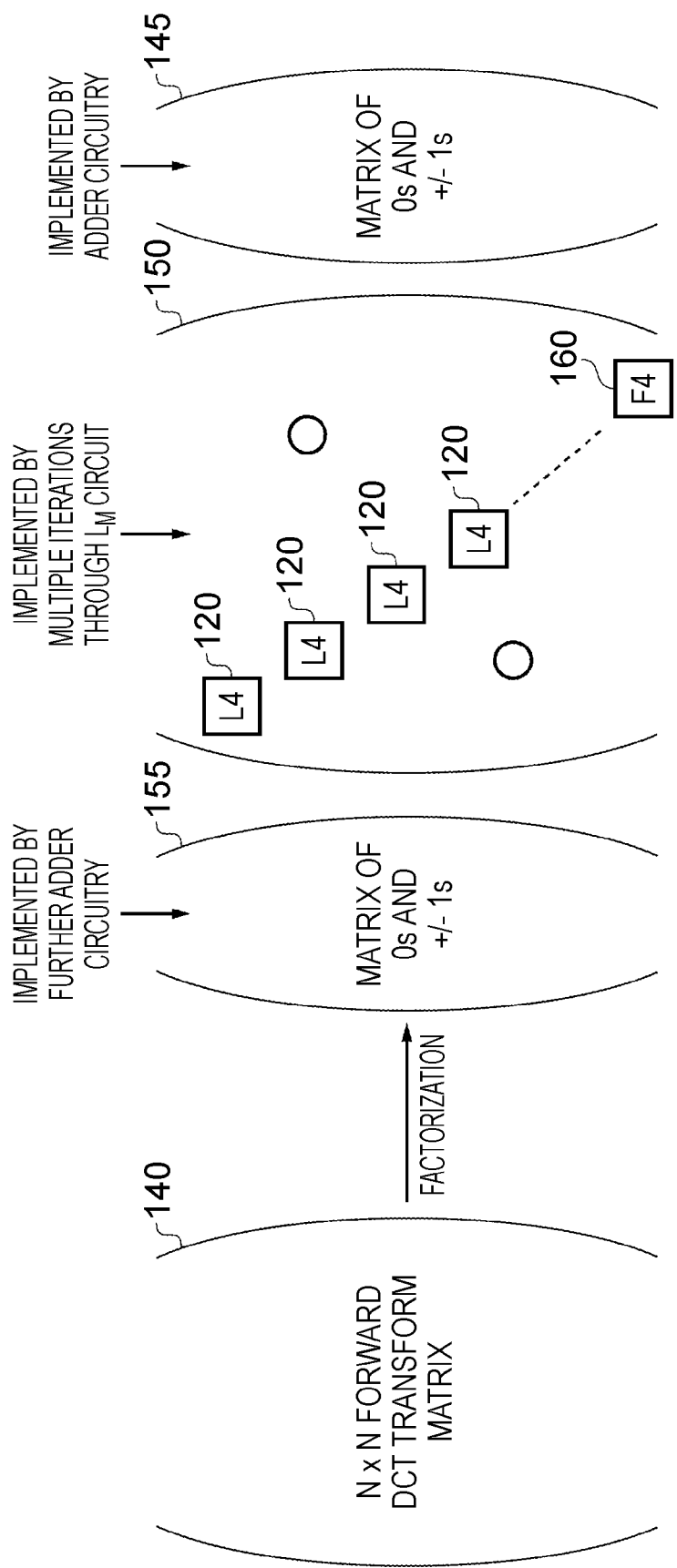
FIG. 3B (forward transform)

DATA PROCESSING APPARATUS AND METHOD FOR PERFORMING A TRANSFORM BETWEEN SPATIAL AND FREQUENCY DOMAINS WHEN PROCESSING VIDEO DATA

This application claims priority to GB Application No. 1308186.4 filed May 7, 2013, the entire contents of which are incorporated herein by reference.

BACKGROUND OF THE INVENTION

1. Field of the Invention

The present invention relates to techniques for performing a transform between spatial and frequency domains when processing video data. Such transforms are typically performed by both video encoders and video decoders, with a video encoder performing a forward transform to convert a video signal from the spatial domain to the frequency domain, and a video decoder performing a corresponding inverse transform in order to convert the encoded signal from the frequency domain back to the spatial domain.

2. Description of the Prior Art

There are various known transforms for converting signals between the spatial and frequency domains. A commonly used transform is the discrete cosine transform. Contemporary video encoders and decoders may be required to perform video encoding and decoding operations in accordance with a number of video standards, such as MPEG2, MPEG4, H.263, H.264 high profile, VP8, VC-1 and so on. It is known that a particularly computationally intensive part of the video encoding and decoding process is the performance of the transform operation.

Video encoding and decoding has typically been performed on the basis of 8×8 blocks of pixel data, wherein four 8×8 blocks of luma (Y) data and two 8×8 blocks of chroma (Cb and Cr) data represent a given macroblock of the video data. The transform operations are performed on all six 8×8 blocks for each macroblock to produce six transformed output 8×8 blocks.

Until recently, only relatively small transform operations have been needed, such as 8×8 transforms in the above mentioned examples. However, with the introduction of high definition video newer video standards are emerging, such as the HEVC standard, which requires transform operations to be performed on larger arrays, for example 16×16 and 32×32. Many of the techniques developed to efficiently perform the smaller sized transforms have been found not to be scalable to such larger transforms.

Considering specifically the example of a discrete cosine transform (DCT), various papers have studied larger DCTs, and techniques have been developed for enabling such large DCTs to be efficiently implemented by Fast Fourier Transform (FFT) style methods when repeated multiplications are permitted (i.e. the result of one multiplication is fed as an input to a further multiplication). For example the two papers by Feig & Winograd entitled "On the Multiplicative Complexity of Discrete Cosine Transforms", IEEE Trans Information Theory, Volume 38, No. 4, July 1992, and "Fast Algorithms for the Discrete Cosine Transform", IEEE Trans Signal Processing, Volume 40, No. 9, September 1992, discuss possible algorithms for optimising DCTs which reduce the number of multiplication operations required. However, generally these techniques require the earlier mentioned repeated multiplications, particularly for the larger transform sizes.

However, in video standards, there is often a requirement for the outputs of at least the decoding operation to be bit exact, since in video processing the contents of certain pictures are predicted from the previous picture. Taking the specific example of the HEVC standard, the inverse transform operation performed during decoding must be implemented to exactly match the output of a reference fixed-point version of the transform using integer multiplies. As a result, the known optimisation techniques that use repeated multiplications (typically in combination with shift operations) cannot be used due to the rounding errors introduced.

A known technique which avoids the need for such repeated multiplications, and hence can be used when bit exact results are required, uses repeated (A+B, A-B) butterflies to reduce the number of multiply operations required. When considering the example of a 32×32 transform, then without any optimisation this would require 32×32 multiplications for each one dimensional transform, i.e. 1024 multiplications. Through the use of such known butterfly techniques, the number of multiplications for that specific scenario can be reduced to 342.

Nevertheless, this is still a significant number of multiplications to perform, and this number of multiplications needs to be repeated for every one dimensional transformation. For example, video encoding and decoding typically uses two dimensional DCTs, and hence by way of example using the HEVC standard, each block of video data to be processed may consist of an array of 32×32 data values. Typically the two dimensional discrete cosine transform is implemented by performing a series of one dimensional transforms applied to each row and each column of the array, and hence in the above example would involve the performance of 32 one dimensional transforms to cover each row of the array, followed by 32 one dimensional transforms to cover each of the columns. Hence, 64 one dimensional transforms will be required for each block of video data, and each one dimensional transform would require 342 multiplication operations in accordance with the specific butterfly technique discussed earlier.

There is a continual desire to provide higher performance and lower area cost video encoders and decoders, and accordingly it would be desirable to reduce the number of multiplications required during performance of forward and inverse transform operations on video data. This desire is becoming more and more acute as the size of the transformations to be supported increases in accordance with the newer video standards such as the HEVC standard.

SUMMARY OF THE INVENTION

Viewed from a first aspect, the present invention provides a data processing apparatus for performing a transform between spatial and frequency domains when processing video data, the data processing apparatus comprising: transform circuitry configured to receive N input values and to perform a sequence of operations to generate N output values representing the transform of said N input values between the spatial and frequency domains; a base circuitry configured to receive M internal input values generated by the transform circuitry, where M is greater than or equal to 4, and to perform a base operation equivalent to matrix multiplication of said M internal input values by a matrix comprising an array of coefficients c and having the form $$\begin{matrix} c_0 & c_1 & c_2 & \dots & c_{M-1} \\ c_1 & c_2 & c_3 & \dots & c_M \\ c_2 & c_3 & c_4 & \dots & c_{M+1} \\ & & \dots & & \\ c_{M-1} & c_M & c_{M+1} & \dots & c_{2M-2} \end{matrix}$$

in order to generate M internal output values for returning to the transform circuitry; and the transform circuitry being arranged during performance of said sequence of operations to generate from the N input values multiple sets of said M internal input values, to provide each set of M internal input values to the base circuitry in order to cause multiple sets of said M internal output values to be produced, and to derive the N output values from said multiple sets of M internal output values.

In accordance with the present invention, the data processing apparatus is configured to make repeated use of a base circuitry that is configured to perform a base operation equivalent to matrix multiplication of M internal input values by a matrix comprising an array of coefficient c and having the form $$\begin{matrix} c_0 & c_1 & c_2 & \dots & c_{M-1} \\ c_1 & c_2 & c_3 & \dots & c_M \\ c_2 & c_3 & c_4 & \dots & c_{M+1} \\ & & \dots & & \\ c_{M-1} & c_M & c_{M+1} & \dots & c_{2M-2} \end{matrix}$$

M is greater than or equal to 4, and in one example M is equal to 4. Transform circuitry manipulates the originally provided N input values in order to generate multiple sets of M internal input values, with each set of M internal input values being passed through the base circuitry. Hence, the base circuitry is used iteratively for each of the sets of M internal input values produced by the transform circuitry. The transform circuitry then derives the N output values from the multiple sets of M internal output values produced by the base circuitry.

Often the above described technique of the present invention will be employed repetitively on a series of one dimensional transforms in order to implement a two dimensional transform. For each one dimensional transform, a set of N input values will be input to the transform circuitry of the data processing apparatus. In accordance with the present invention, each set of M internal input values is only passed once through the base circuitry for a particular provided set of N input values, and none of the internal output values generated by the base circuitry are used as the input to a subsequent iteration of the multiplication performed by the base circuitry. Hence there are no repeated multiplications performed when using the apparatus of the present invention, and accordingly this enables a bit exact result to be generated by the apparatus, as required by modern standards such as the HEVC video standard.

The particular form of matrix employed within the base circuitry is a square matrix with constant skew diagonals (i.e. positive sloping diagonals), and is also known as a Hankel matrix. The inventors of the present invention have realised that for even the larger transforms required by modern video processing standards, the required transform between spatial and frequency domains can be factorized in a manner that enables repeated matrix multiplications of a smaller size using the Hankel matrix.

The base operation performed by the base circuitry is able to handle any particular instance of the Hankel matrix of the above mentioned form, and hence is able to perform an operation equivalent to matrix multiplication of the M internal input values by the Hankel matrix irrespective of the values allocated to the coefficients $c_0$ to $c_{2M-2}$. Hence, by way of example, the base circuitry is able to perform the required operation even if all of the coefficients $c_0$ to $c_{2M-2}$ have different values, and/or if the values of the coefficients vary for each set of M internal input values provided to the base circuitry.

Further, the technique of the present invention may be used for both encoding and decoding and is readily scalable for varying sizes of N.

It has been found that the above arrangement enables a significant reduction in the number of multiplications required in order to perform a transform of the N input values between the spatial and frequency domains. For example, considering the earlier mentioned 32-point transform required by the new HEVC video standard, it has been found that in accordance with the technique of the present invention approximately a third the number of multiplications are required when compared with the partial butterfly approach used by the HEVC reference software. The HEVC reference software (also known as HM-8.0 at http://r2d2n3po.tistory.com/61) is a C code implementation of the Standard used as a reference implementation to the paper Standard.

The transform performed between the spatial and frequency domains can take a variety of forms, but in one embodiment is a discrete cosine transform.

There are a number of ways in which the transform circuitry can be arranged to generate each set of M internal input values provided to the base circuitry. However, in one embodiment the transform circuitry comprises permutation circuitry configured to permute the received N input values in order to produce K groups of input values, where K=N/M and hence each group has M members, each member being one of said received N input values. Adder circuitry is then configured to perform at least one of addition and subtraction operations on corresponding members from selected groups in order to generate each set of said M internal input values.

The actual permutation performed by the permutation circuitry will depend upon whether the apparatus is being used to perform a forward transform from the spatial to the frequency domain or an inverse transform from the frequency to the spatial domain Similarly, the addition and subtraction operations performed by the adder circuitry will differ depending on whether a forward transform or an inverse transform is being performed.

The manner in which the transform circuitry is configured to derive the N output values from the multiple sets of M internal output values may vary dependent on embodiment. However, in on embodiment the transform circuitry further comprises further adder circuitry configured to perform at least one of addition and subtraction operations on the multiple sets of said M internal output values produced by the base circuitry in order to produce N intermediate output values. The additions/subtractions performed by the adder circuitry and the further adder circuitry will depend upon whether the apparatus is being used to perform a forward transform or an inverse transform.

In one embodiment, the transform circuitry further comprises shift circuitry configured to perform a shift operation on the N intermediate output values in order to generate shifted intermediate output values. It should be noted that the shift operation is only performed once, after the N intermediate output values have been generated following the iterative operation of the base circuitry on the various sets of M internal input values. This serves to ensure the exact nature of the results. The once shifted values are output and not recirculated (except potentially to form an input value for another related 1 dimensional transform).

In one embodiment, the shift operation includes a saturate operation. Again, as with the shift operation, the saturate operation is only performed once.

In one embodiment, the transform circuitry further comprises further permutation circuitry configured to permute the N shifted intermediate output values in order to generate said N output values. The permutation performed by the further permutation circuitry will be dependent on the permutation performed by the permutation circuitry on the N input values.

In one embodiment, the apparatus further comprises coefficient generation circuitry configured to generate, for each set of M internal input values, a corresponding set of coefficient values to be used by the base circuitry when performing the base operation. Hence, the set of coefficient values can be set for each iteration of the base circuitry.

As mentioned earlier, the apparatus can be used to perform either a forward transform from the spatial to the frequency domain or an inverse transform from the frequency to the spatial domain. In one embodiment the apparatus is configurable so that it can be switched between performing either a forward transform or an inverse transform.

In one particular embodiment, the corresponding set of coefficient values generated by the coefficient generation circuitry for each set of M internal input values are the same irrespective of whether the data processing apparatus is configured to perform the forward transform or is configured to perform the inverse transform. Hence, whilst the operations of the permutation circuitry, adder circuitry, further adder circuitry and further permutation circuitry will be modified dependent on whether the apparatus is performing a forward transform or an inverse transform, the basic operation of the base circuitry is unchanged, and exactly the same coefficients are generated by the coefficient generation circuitry assuming the apparatus is still operating in accordance with the same video standard.

Whilst the apparatus of embodiments performs multiple iterations of the earlier described base operation, it will typically still be necessary to perform a small transform, in particular an M×M transform. Hence, in one embodiment, the transform circuitry is further configured to generate a further set of M internal input values for provision to the base circuitry, and the base circuitry is configured to perform a discrete cosine transform on said further set of M internal input values by performing a discrete cosine transform operation equivalent to matrix multiplication of said further set of M internal input values by a discrete cosine transform matrix.

In one particular embodiment, the data processing apparatus is configured to perform a forward discrete cosine transform during encoding of the video data, and the base circuitry is configured to perform as the discrete cosine transform operation a forward discrete transform operation following performance of the base operation on said multiple sets of M internal input values.

In contrast, if the data processing apparatus is configured to perform an inverse discrete cosine transform during decoding of the video data, the base circuitry is configured to perform as the discrete cosine transform operation an inverse discrete transform operation prior to performance of the base operation on said multiple sets of M internal input values.

The value of N may vary dependent on embodiment. In one embodiment, N is a multiple of M. In one particular embodiment, N is constrained to be a power of two.

As mentioned earlier, M may be greater than or equal to 4, and in one embodiment M is set equal to 4. Hence, in that embodiment, all of the multiplications performed are in respect of a 4×4 matrix, irrespective of the size of N.

The adder circuitry can be configured in a variety of ways, but in one embodiment the adder circuitry is configured as SIMD circuitry providing M lanes of parallel processing for performing said at least one of addition and subtraction operations in parallel in order to generate each set of said M internal input values.

Similarly, in one embodiment the further adder circuitry may be configured as SIMD circuitry providing M lanes of parallel processing for performing said at least one of addition and subtraction operations in parallel on each set of said M internal output values produced by the base circuitry.

As mentioned earlier, the number of multiplications required to transform the N input values between spatial and frequency domains is significantly reduced when using the techniques of the above described embodiments. In one particular embodiment, the data processing apparatus is configured to operate on video data blocks comprising an N×N array of data values by separately performing, on each row and each column of N data values, said transform between the spatial and frequency domains, and the total number of multiplications performed by said base circuitry for each said row or each said column is $3^{n-1}+3^{n-2}+\ldots+9+Z$, where Z is $\leq 9$, and where $N=2^n$. The value of Z depends on the number of multiplications required to perform the single M×M discrete cosine transform, and in one specific implementation configured to operate on a 32×32 array (i.e. N=32) and where M=4, it has been found that six multiplies are required for the single 4×4 discrete cosine transform (i.e. Z=6). From the above equation, this results in 123 multiplies being required, this being approximately a third of the number of multiplies that would be required by the earlier mentioned partial butterfly approach.

It has been found that the apparatus of the above described embodiments offers significant flexibility. Not only can the same apparatus be configured to perform both forward transforms and inverse transforms, but in addition the apparatus may be configurable to support different video standards. In particular, in one embodiment the apparatus is configurable to support different video Standards by causing the coefficient generation circuitry to set the corresponding set of the coefficients supplied to the base circuitry for each set of M internal input values dependent on a currently selected video Standard.

Viewed from a second aspect, the present invention provides a method of performing a transform between spatial and frequency domains when processing video data, the method comprising: employing transform circuitry to receive N input values and to perform a sequence of operations to generate N output values representing the transform of said N input values between the spatial and frequency domains; employing a base circuitry to receive M internal input values generated by the transform circuitry, where M is greater than or equal to 4, and to perform a base operation equivalent to matrix multiplication of said M internal input values by a matrix comprising an array of coefficients c and having the form $$\begin{matrix} c_0 & c_1 & c_2 & \ldots & c_{M-1} \\ c_1 & c_2 & c_3 & \ldots & c_M \\ c_2 & c_3 & c_4 & \ldots & c_{M+1} \\ & & \ldots & & \\ c_{M-1} & c_M & c_{M+1} & \ldots & c_{2M-2} \end{matrix}$$

in order to generate M internal output values for returning to the transform circuitry; and performance of said sequence of operations by the transform circuitry comprising: generating from the N input values multiple sets of said M internal input values; providing each set of M internal input values to the base circuitry in order to cause multiple sets of said M internal output values to be produced; and deriving the N output values from said multiple sets of M internal output values.

Viewed from a third aspect, the present invention provides a data processing apparatus for performing a transform between spatial and frequency domains when processing video data, the data processing apparatus comprising: transform means for receiving N input values and for performing a sequence of operations to generate N output values representing the transform of said N input values between the spatial and frequency domains; base circuitry means for receiving M internal input values generated by the transform means, where M is greater than or equal to 4, and for performing a base operation equivalent to matrix multiplication of said M internal input values by a matrix comprising an array of coefficients c and having the form $$\begin{matrix} c_0 & c_1 & c_2 & \ldots & c_{M-1} \\ c_1 & c_2 & c_3 & \ldots & c_M \\ c_2 & c_3 & c_4 & \ldots & c_{M+1} \\ & & \ldots & & \\ c_{M-1} & c_M & c_{M+1} & \ldots & c_{2M-2} \end{matrix}$$

in order to generate M internal output values for returning to the transform means; and the transform means, during performance of said sequence of operations, for generating from the N input values multiple sets of said M internal input values, for providing each set of M internal input values to the base circuitry means in order to cause multiple sets of said M internal output values to be produced, and for deriving the N output values from said multiple sets of M internal output values.

BRIEF DESCRIPTION OF THE DRAWINGS

The present invention will be described further, by way of example only, with reference to embodiments thereof as illustrated in the accompanying drawings, in which:

FIG. 3A illustrates how the N×N inverse DCT transform matrix may be factorized in accordance with one embodiment, in order to implement the N×N matrix by a series of smaller linear correlation matrices and a single smaller inverse DCT matrix with the inputs and outputs to those matrices being subjected to various addition and subtraction operations;

FIG. 3B illustrates how the N×N forward DCT transform matrix may be factorized in accordance with one embodiment, in order to implement the N×N matrix by a series of smaller linear correlation matrices and a single forward DCT matrix with the inputs and outputs to those matrices being subjected to various addition and subtraction operations;

DESCRIPTION OF EMBODIMENTS

Figure 1:
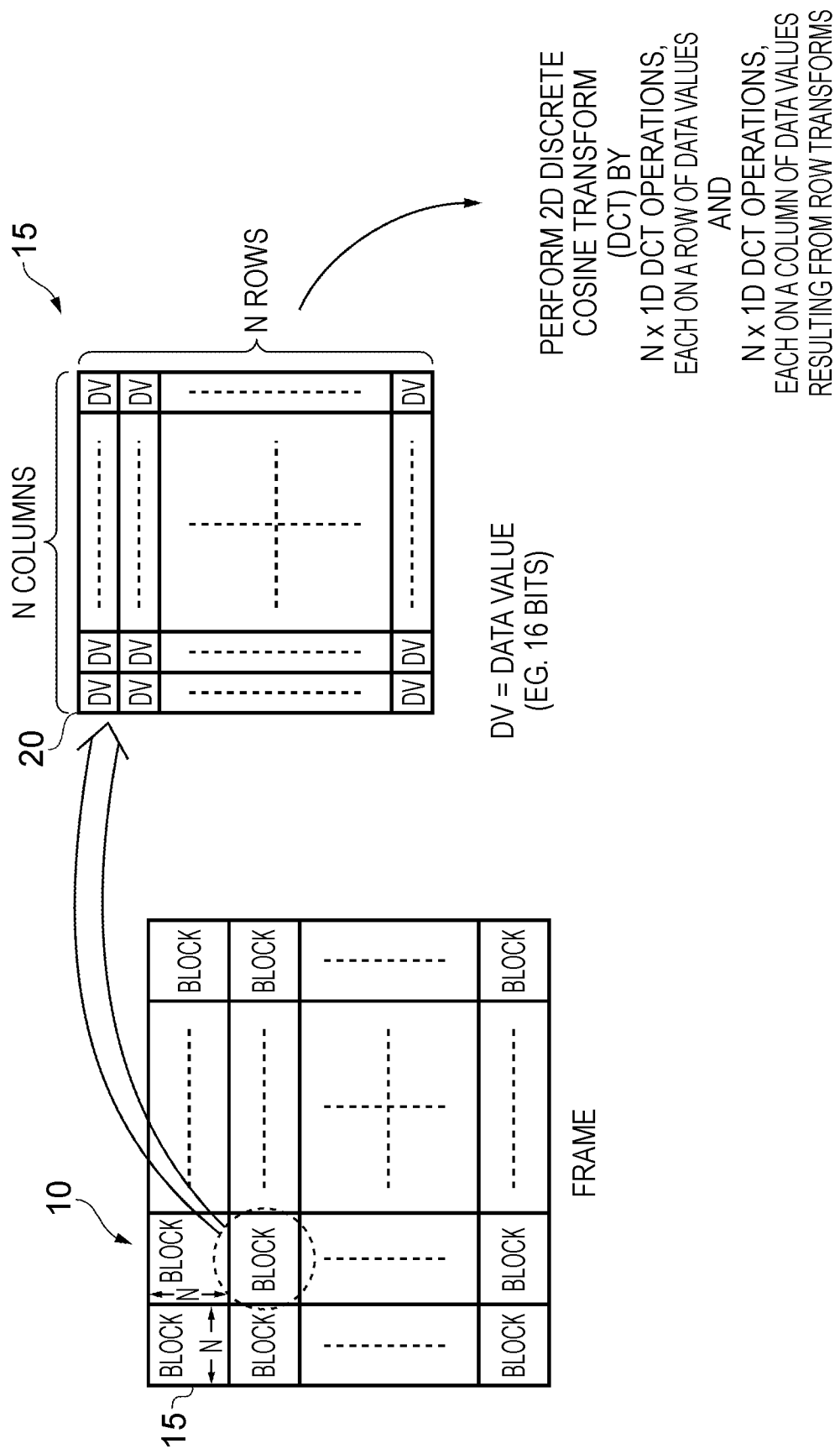
FIG. 1 is a diagram schematically illustrating how a frame of video data is processed in a block by block manner in accordance with a known technique.

FIG. 1 illustrates a frame 10 of video data, the frame being considered as an array of blocks 15, each block comprising an N×N array of data values 20. Each data value will typically comprise multiple bits, for example 16 bits of data. When performing an encoding operation on input video data, each such block 15 will be subjected to a two dimensional transform operation to convert the data from the spatial to the frequency domain. Typically a forward discrete cosine transform (FDCT) operation will be performed in order to perform such encoding. Similarly, when decoding an encoded frame of video data, each block will be subjected to a two dimensional inverse discrete cosine transform (IDCT) operation in order to convert the received encoded signal from the frequency domain to the spatial domain.

In practice, the two dimensional DCT operation is performed by a series of one dimensional DCT operations. For example, it is typically the case that a one dimensional DCT operation will be performed on each of the rows to produce some intermediate results, and this will then be followed by a corresponding series of one dimensional DCT operations performed on each column of those intermediate results. Accordingly, for an N×N block, 2N one dimensional DCT operations will need to be performed in order to implement the required two dimensional DCT operation.

Figure 2:
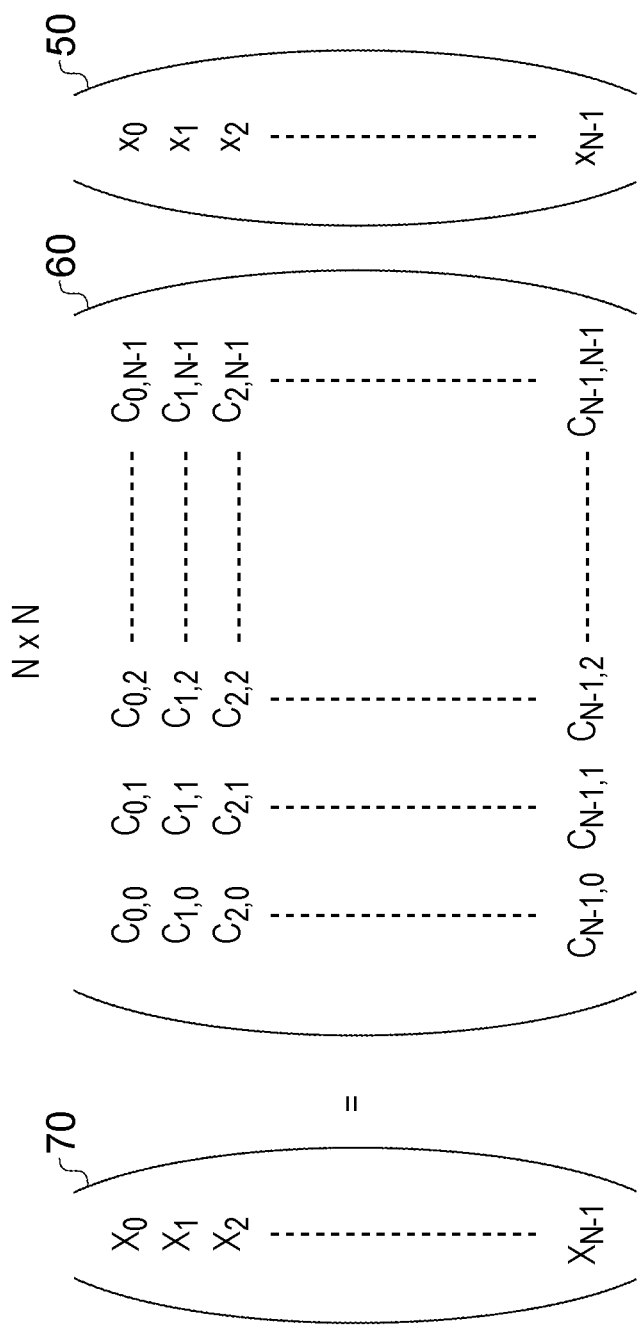
FIG. 2 illustrates a one dimensional DCT transform operation in accordance with a known approach.

FIG. 2 schematically illustrates a standard one dimensional DCT operation performed on a row or a column of input values $x_0$ to $x_{N-1}$ 50. These N input values 50 are multiplied by an N×N matrix 60 comprising an N×N matrix of coefficient values. As illustrated schematically in FIG. 2, the coefficients in each row are multiplied by the corresponding input values, with the results then being added to produce an associated output value. Accordingly, N output values $X_0$ to $X_{N-1}$ 70 will be generated.

From FIG. 2, it will be appreciated that a large number of multiplications need to be performed for each one dimensional transform operation. For example, considering the situation where N is 32, then each one dimensional transform operation will require 32×32 multiplications, i.e. 1024 multiplications. As mentioned earlier, known butterfly techniques can be used to reduce the number of multiplications. In particular, considering again the example where N is 32, this would enable the number of multiplications to be reduced to 342. However, it would be desirable to further reduce the number of multiplications required to perform each one dimensional transform operation whilst still enabling a bit exact result to be achieved.

FIG. 3A schematically illustrates the factorization approach adopted in accordance with the described embodiments for an inverse transform operation in order to enable the N×N IDCT matrix to be degenerated into a series of smaller matrices. In particular, in accordance with the described embodiments, the N×N IDCT matrix 100 is effectively replaced by a matrix 110, the matrix 110 being larger (i.e. having a longer diagonal) than the matrix 100, but containing fewer non-zero elements, and indeed typically a large number of the coefficient values in the matrix 110 are zero. Along the diagonal path through the matrix 110, a number of smaller M×M matrices are defined. In this particular example it is assumed that M is equal to 4, and as shown a series of L4 matrices 120 are provided, each L4 matrix being a Hankel matrix of the earlier described form, i.e. a linear correlation matrix with constant skew diagonals. The actual values of the coefficients in one instance of the L4 matrix 120 will typically be different to the values in another instance of the L4 matrix.

As also shown, an initial IDCT (T4) matrix 130 is provided, this being an IDCT matrix of size 4×4. A base circuit provided within the apparatus of the described embodiments can be used to iteratively perform matrix multiplications using each of these defined 4×4 matrix instances 130, 120, starting with the matrix in the top left of the matrix 110. However, the M internal input values provided to the base circuit need to be separately derived for each iteration, based on the supplied N input values. As will be discussed later with reference to FIG. 4, this is achieved by using permute circuitry to permute the received N input values in order to produce K groups of input values, where K=N/M and hence each group has M members, each member being one of the received N input values. Further, adder circuitry is then used to perform a series of addition and subtraction operations on corresponding members from selected groups in order to generate each set of M internal input values. The required addition and subtraction operations that need to be performed are defined within the matrix 105 of 0s and +/−1 values shown in FIG. 3A. Similarly, the internal output values generated by the base circuit need manipulation before they can be used to generate the N output values corresponding to the IDCT of the N input values. In particular, as will be discussed later with reference to FIG. 4, further adder circuitry is used to perform a series of addition and subtraction operations on the multiple sets of M internal output values produced by the base circuitry, with the matrix 115 of 0s and +/−1 values identifying the required addition and subtraction operations.

FIG. 3B illustrates how the same basic factorization approach can be used to perform a forward DCT operation. In particular, the N×N FDCT matrix 140 is effectively degenerated into the matrix 150 comprising a similar arrangement of smaller M×M (in this case 4×4) matrices. In particular, a series of L4 matrices 120 are again provided, but in this instance a FDCT 4×4 (F4) matrix 160 is provided instead of the IDCT 4×4 (T4) matrix 130 of FIG. 3A. In addition, the base circuitry performs the F4 matrix multiplication 160 as a final iteration, whereas in the example of FIG. 3A the T4 matrix multiplication is performed as an initial iteration by the base circuitry. Again, a matrix of 0s and +/−1 values 145 is used to define the addition and subtraction operations to be performed by the adder circuitry when generating the internal input values to provide to the base circuitry for each iteration, and similarly a matrix 155 of 0s and +/−1s is used to identify the addition and subtraction operations required by the further adder circuitry used to process the internal output values generated by the base circuitry.

Considering the relative sizes of the various matrices shown in FIGS. 3A and 3B, then assuming the original matrices 100, 140 are N*N, and if $N=2^n=4 \times 2^{n-2}$, then the width of the matrix 110 or 150 will be $4 \times (3^{n-3}+3^{n-4}+ \ldots +3+1+1)$. Considering the specific example where N=32, n=5 and hence the width of the matrix 110 or 150 will be 4×(9+3+1+1), i.e. 56. Hence, each of the matrices 110 and 150 will be 56×56 matrices. In that instance, the matrices 105 and 145 will be 32(across)×56(down), and the matrices 115 and 155 will be 56(across)×32(down).

Figure 4:
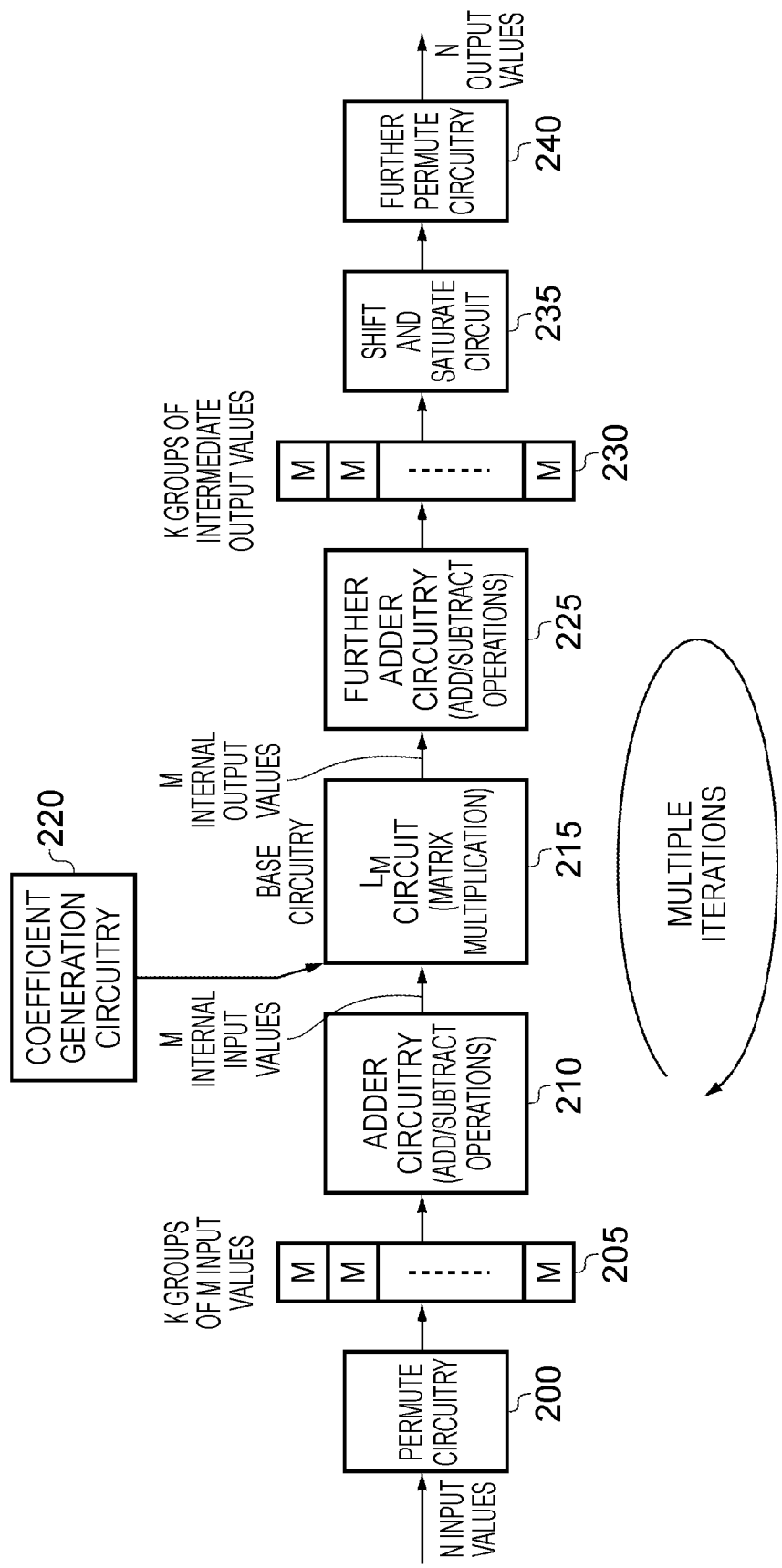
FIG. 4 is a block diagram schematically illustrating components provided within a data processing apparatus in accordance with one embodiment in order to perform a transform between spatial and frequency domains for N received input values.

FIG. 4 is a block diagram illustrating components provided within the data processing apparatus in accordance with one embodiment. Permute circuitry 200 is arranged to receive each set of N input values, and is configured to perform a permutation on those N input values in order to produce K groups of input values stored within internal storage 205. K is equal to N/M and hence each group has M members, where each member is one of the received N input values. Hence, by way of example, if N is 32 and M is 4, there will be eight groups provided within the storage 205.

The adder circuitry 210 is then used to generate each set of M internal input values to be provided to the base circuitry 215 (also referred to herein as the LM circuit). The adder circuitry is configured to operate on corresponding members from selected groups, and hence in one iteration may operate on member 0 from a selected number of the groups, and in another iteration may operate on member 1 from a number of the groups. As discussed earlier with reference to FIGS. 3A and 3B, a matrix 105, 125 is referenced by the adder circuitry in order to determine the required addition and subtraction operations for any particular iteration.

Considering the example of FIG. 3A where an inverse transform is performed, it will be appreciated that during a first iteration the adder circuitry generates M internal input values to be subjected to a matrix multiplication using the TM matrix forming an M×M IDCT matrix. For the particular example of FIG. 3A, it is assumed that M is 4, and accordingly the M internal input values generated by the adder circuitry 210 during a first iteration will be subject to a matrix multiplication by the T4 matrix 130 using the base circuitry 215. The coefficient generation circuitry 220 generates the values of the coefficients contained within the T4 matrix 130. The base circuitry 215 will then perform the required matrix multiplication operation in order to generate M internal output values which are routed to the further adder circuitry 225. The further adder circuitry then performs the addition and subtraction operations defined by the matrix 115 in order to generate intermediate output values stored within the storage 230. These intermediate output values can be considered to form K groups of intermediate output values, where again each group has M members, each member being one of the intermediate output values. The storage 230 is populated such that by the time all iterations have been performed, the storage 230 is populated with all of the N intermediate output values.

Returning to the example of FIG. 3A, following the first iteration where the small 4×4 IDCT transformation is performed, a series of matrix multiplications will then be performed over multiple iterations to multiply generated sets of M internal input values by the various linear correlation matrices 120, in FIG. 3A these linear correlation matrices each taking the form of a 4×4 Hankel matrix. For each iteration, the adder circuitry 210 will reference the matrix 105 in order to determine the appropriate addition and subtraction operations to be performed when generating each set of internal input values, and the coefficient generation circuitry 220 will generate the appropriate coefficient values for each iteration. Similarly the further adder circuitry 225 will reference the matrix 115 in order to determine the appropriate addition and subtraction operations to be performed on the internal output values generated by the base circuitry during each iteration.

Once all of the required iterations have been performed, and the storage 230 has been populated with the N intermediate output values, those intermediate output values are passed through the shift and saturate circuit 235, where a shift and saturate operation is performed in order to generate shifted and saturated intermediate output values. It should be noted that the shift and saturate operation is only performed once, after all of the N intermediate output values have been generated, and this serves to ensure the bit exact nature of the results, in particular avoiding rounding errors that would be introduced by iteratively performing shifting and saturating operations at multiple stages during the process.

The shifted and saturated intermediate output values are then passed to the further permute circuitry 240 which is configured to permute the N shifted and saturated intermediate output values in order to generate the required N output values. The permutation performed by the further permutation circuitry 240 is dependent on the permutation performed by the permute circuitry 200 on the input values.

The circuitry of FIG. 4 can be configured to perform either a forward transform during encoding of video data to transform that data from the spatial to the frequency domain, or an inverse transform during decoding data to transform that data from the frequency domain to the spatial domain. The permutations performed by the permute circuitry 200 and the further permute circuitry 240 will depend upon whether the apparatus is being used to perform a forward transform or an inverse transform. Similarly the addition and subtraction operations performed by the adder circuitry 210 and the further adder circuitry 225 will differ depending on whether a forward transform or an inverse transform is being performed.

The coefficient generation circuitry 220 will need to generate coefficients for the T4 matrix 130 when performing the inverse transform operation or for the F4 matrix 140 when performing the forward transformation. However, the coefficients generated for each instance of the L4 matrices 120 are in some cases (e.g. for large HEVC matrices, where the forward matrix is the transpose of the inverse matrix) unchanged when reconfiguring the apparatus between performance of a forward transform and an inverse transform. Accordingly, when performing the multiple iterations of the L4 matrix multiplication, the operation of the base circuitry is unchanged in those cases, and exactly the same coefficients are generated by the coefficient generation circuitry 220.

The apparatus can also be used to implement various video standards. However, the coefficients generated by the coefficient generation circuitry 220 will vary between the different video standards. In contrast, the basic operation of the permute circuitry 200, adder circuitry 210, further adder circuitry 225 and further permute circuitry 240 is typically unaffected by changing the video standard.

Figure 5:
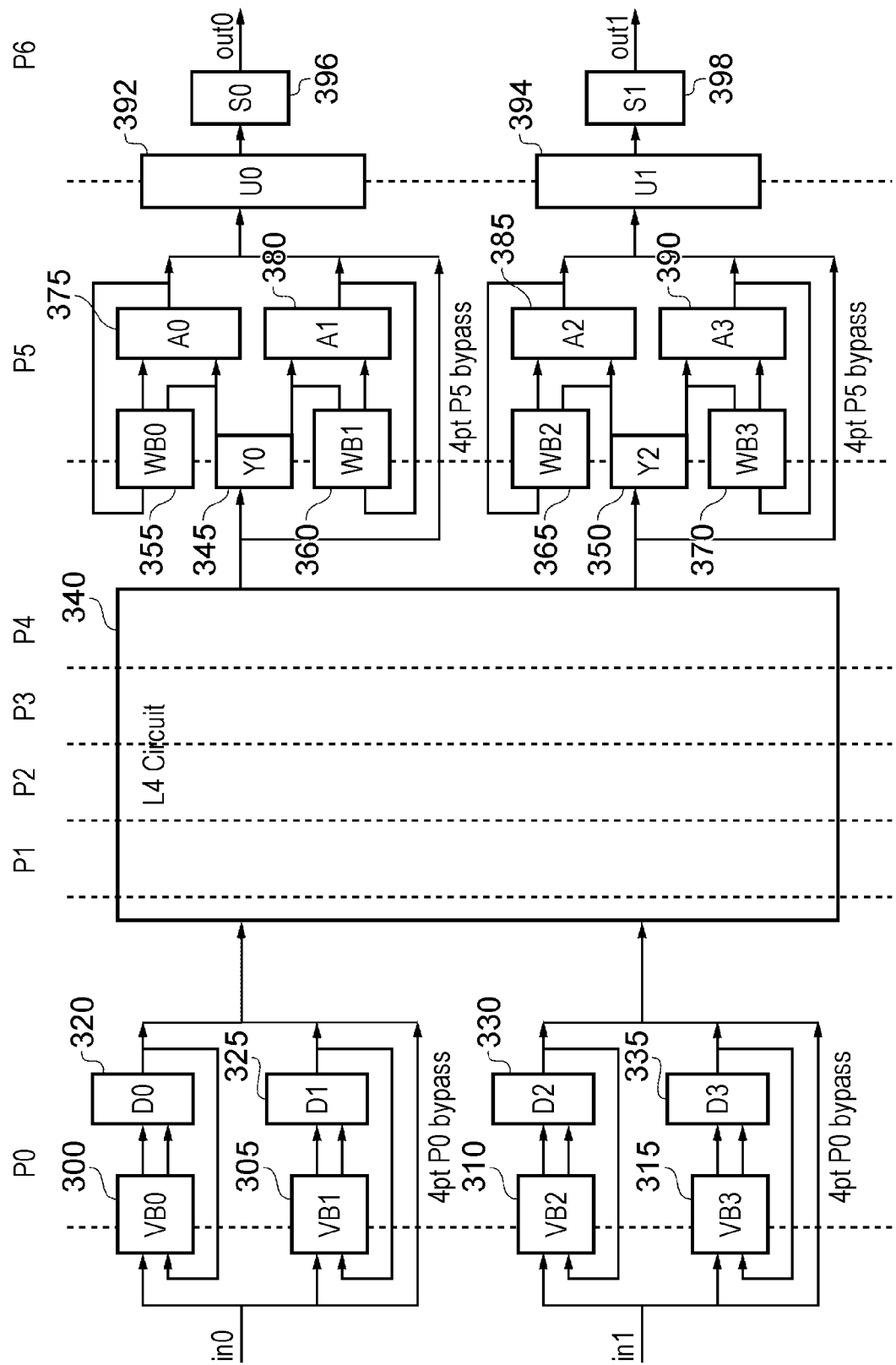
FIG. 5 schematically illustrates components provided within the adder circuitry and further adder circuitry of FIG. 4 in accordance with one embodiment.

FIG. 5 illustrates components provided within the adder circuitry 210 and further adder circuitry 225 in accordance with one embodiment. In this example, it is assumed that M equals 4, and hence once the K groups of M input values have been stored within the storage 205 of FIG. 4, it will be appreciated that each group has four members. In this example the storage 205 is considered to form part of the adder circuitry 210 and includes four register banks VB0 300, VB1 305, VB2 310 and VB3 315, each register bank having sufficient registers to store corresponding members from each of the groups. Hence, considering the example where N is 32, there will be eight groups, each with four members, and each of the register banks 300, 305, 310, 315 will provide eight registers in order to enable the corresponding members from each of the eight groups to be stored therein.

The permuted input values produced by the permute circuitry 200 are typically buffered within a RAM and then loaded serially via the in0 and in1 inputs (two data values per cycle) in the permuted order into the relevant register banks 300, 305, 310, 315.

Corresponding two-input adders 320, 325, 330, 335 are provided in association with each of the register banks 300, 305, 310, 315 and, in the embodiment shown, during each clock cycle two of those adders may be used to generate internal input values to provide to the L4 circuit 340 whilst the other two adders are optionally used to generate intermediate values fed back and stored within the associated register bank. For each matrix multiplication performed by the L4 circuit 340, four internal input values are required, and accordingly it takes two clock cycles to generate the inputs required for each matrix multiplication performed by the L4 circuit 340.

In one embodiment, the various adder circuits 320, 325, 330, 335 perform butterfly operations and Karatsuba recursion in order to break down the 32 point transforms to 4 point transforms processed by the L4 circuit 340.

The operation performed by the adder circuitry 210 is in this embodiment performed within a first pipelines stage P0, with the operation of the L4 circuit 340 then occupying four pipeline stages P1 to P4. The further adder circuitry 225 then occupies a sixth pipeline stage P5. As shown, the final stage of the L4 circuit 340 produces two internal output values per cycle which are temporarily stored within the registers 345, 350. Each value stored in the register 345 will then be provided to the adder circuit 375 or the adder circuit 380 as appropriate, and similarly each value stored in the register 350 will be provided to the adder circuit 385 or the adder circuit 390 as appropriate. Initially, the adder circuits 375, 380, 385, 390 will route those values back into the associated register banks WB0 355, WB1 360, WB2 365 and WB3 370. The adder circuits 375, 380, 385, 390 will then use butterfly operations and Karatsuba recursion to reconstruct the 32 point transform output from the 4 point L4 transform outputs and in the latter stages of the process this will result in the two register banks 392 and 394 being populated with N intermediate output values.

Once all the multiplications have been performed by the L4 circuit, the contents of the registers 392, 394 will represent the N intermediate output values, and these will then be routed through the shift and saturate circuits 396, 398 to generate shifted and saturated intermediate output values which can then be routed to the further permute circuit 240 to permute the values back into the final order required for the N output values.

The circuitry of FIG. 5 can be used to support numbers of input values that are multiples of four, in one particular embodiment the number of input values being limited to be a power of 2, such that the N input values may be 4 input values, 8 input values, 16 input values, 32 input values, etc. In situations where N is actually set equal to 4, then as shown in FIG. 5 bypass paths may be provided around the adder circuits 320, 325, 330, 335 and the further adder circuits 375, 380, 385, 390. This optimisation hence allows a low latency path through the circuitry when N is set equal to M. However, the shift and saturate stage of the pipeline path P6 will still be used for all transform sizes.

The multiple adder circuits 320, 325, 330, 335 can be arranged in a SIMD manner so that they operate in parallel to perform four sets of additions/subtractions. However, in one embodiment, the operations of adder circuits D0 and D2 320, 330 are staggered with respect to the operations of the adder circuits 325, 335, such that in a first cycle, only adder circuits 320 and 330 are used, and generate two internal input values for provision to the L4 circuit, whilst in the next cycle adders 325 and 335 are used to generate two further internal input values for provision to the L4 circuit. During that second cycle, the adders 320 and 330 can again be used, but this time will generate intermediate values for routing back to their respective register banks 300, 310. In the next cycle, all four adders can again be used, with the adders 320, 330 providing the internal input values to the L4 circuit, and the adders 325, 335 generating intermediate values for routing back to their respective register banks 305, 315. This provides an efficient mechanism for providing two internal input values per cycle to the L4 circuit 340, whilst also enabling intermediate additions and subtractions to be performed in parallel. The output adder circuits 375, 380, 385, 390 can be arranged in a similar manner to perform SIMD addition and subtraction operations.

In one embodiment, each provided input value is 16 bits in size, and the register banks 300, 305, 310, 315 have 18 bit inputs and outputs to accommodate the increased size of the operands that may be generated by virtue of the additions performed by the adder circuits 320, 325, 330, 335. Hence the adder circuits 320, 325, 330, 335 also have 18 bit inputs and outputs. Within the further adder circuitry 225, each of the registers banks 355, 360, 365, 370 and adder circuits 375, 380, 385, 390 have 32 bit input and output widths in one embodiment, to accommodate the sizes of the internal output values that may be generated as a result of the multiplications performed within the L4 circuit 340. The operation of the shift and saturate circuits 396, 398 takes the relevant 32-bit inputs received from the register bank 392, 394 and produces 16-bit outputs, i.e. output values that are of the same size as the input values.

Figure 6A:
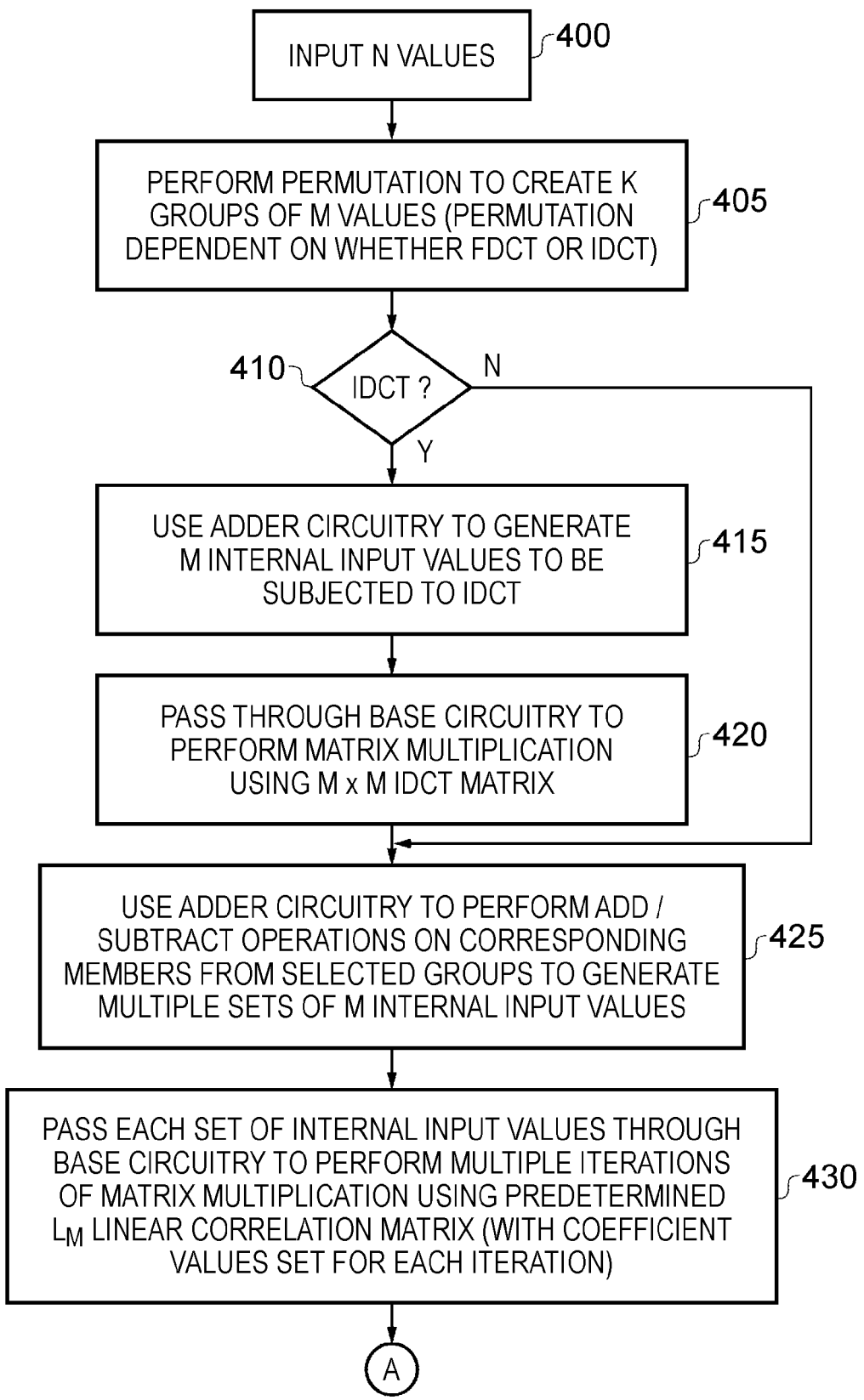
FIGS. 6A and 6B provide a flow diagram illustrating the steps performed by the circuitry of FIG. 4 in order to process one set of N input values in accordance with one embodiment.
Figure 6B:
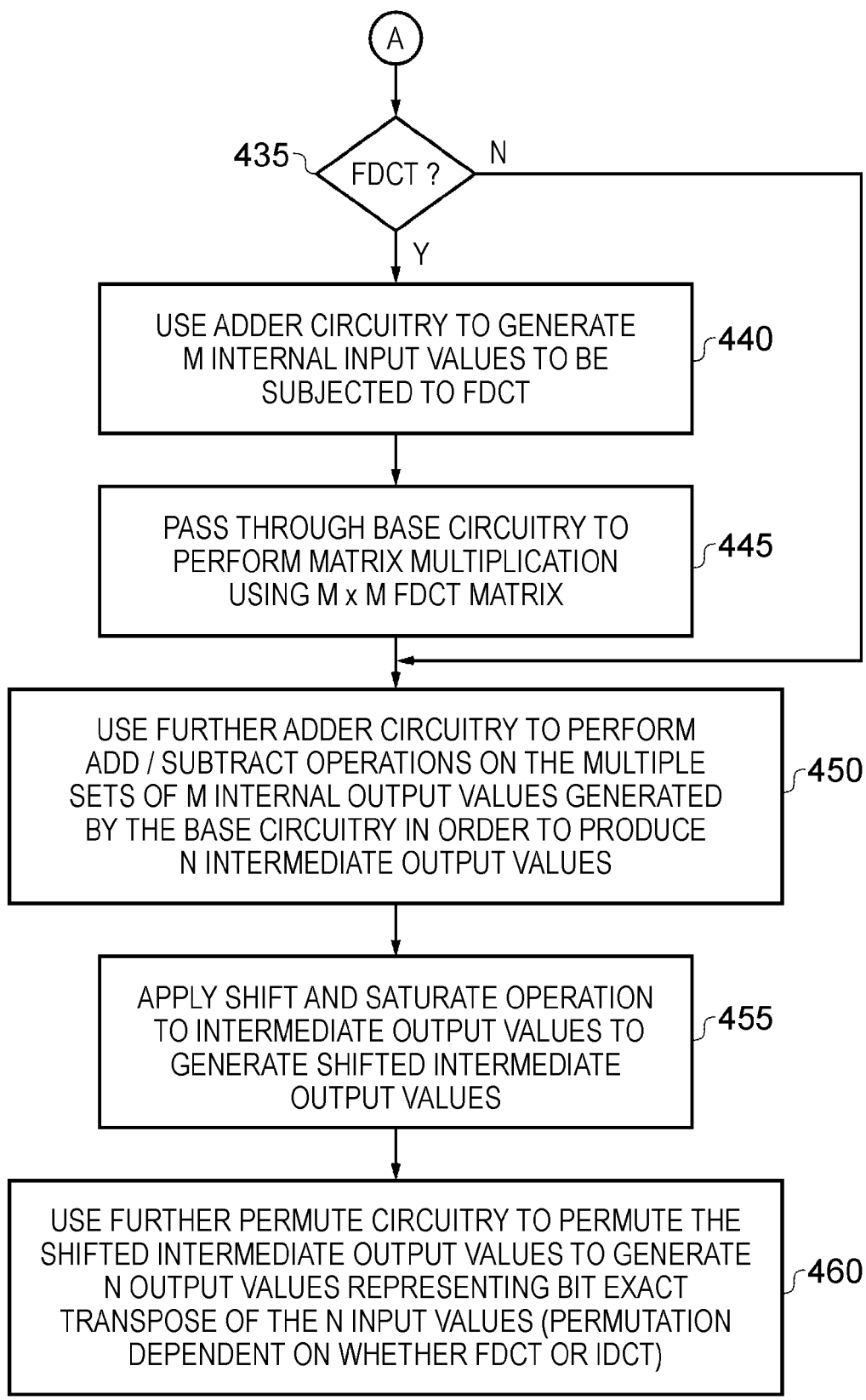

FIGS. 6A and 6B provide a flow diagram illustrating the operation of the circuitry of FIG. 4 in accordance with one embodiment. At step 400, N input values are provided to the permute circuitry 200, whereafter at step 405 a permutation is performed in order to create K groups of M values (with the permutation being dependent on whether the apparatus is configured to perform an FDCT or an IDCT). At step 410, it is determined whether the apparatus is configured to perform an IDCT, and if so the process proceeds to step 415 where the adder circuitry 210 is used to generate M internal input values to be subjected to an IDCT operation. At step 420, those M internal input values are passed through the base circuitry 215 in order to perform matrix multiplication using an M×M IDCT matrix, with the appropriate coefficient values being provided by the coefficient generation circuitry 220.

The process then proceeds to step 425, where the adder circuitry 210 is used to perform addition and subtraction operations on corresponding members from selected groups within the storage 205 in order to generate multiple sets of M internal input values to be subjected to multiplication by the Hankel matrix. At step 430, each set of internal input values is then passed sequentially through the base circuitry 215 in order to cause multiple iterations of the matrix multiplication to be performed using the Hankel matrix (also referred to as an LM linear correlation matrix). As discussed previously, the coefficient generation circuitry 220 will typically generate separate sets of coefficient values for each iteration.

The process then proceeds to step 435, where it is determined whether an FDCT is being performed. If not, then the process proceeds directly to step 450. Conversely, if an FDCT is being performed, then as shown in FIG. 6A, steps 415 and 420 will have been bypassed, and in their place steps 440 and 445 will then be performed following performance of steps 425 and 430. In particular, at step 440, the adder circuitry 210 is used to generate M internal input values to be subjected to the FDCT matrix multiplication using an M×M FDCT matrix. Thereafter, at step 445, those M internal input values are passed through the base circuitry 215 which then performs the required matrix multiplication using the FDCT matrix. Again the coefficient generation circuitry 220 generates the appropriate coefficient values for the M×M FDCT matrix.

Following step 445, or directly following step 435 in the event that an IDCT is being performed, the process proceeds to step 450 where the further adder circuitry is used to perform add and/or subtract operations on the multiple sets of M internal output values generated by the base circuitry 215 in order to produce N intermediate output values. Whilst in FIG. 6B, step 450 is shown as being performed after all of the iterations of the base operation performed by the base circuitry have been performed, it will be appreciated that in alternative embodiments the further adder circuitry may operate on each set of M internal output values as they are generated by the base circuitry.

Once step 450 has been performed, the storage 230 will contain N intermediate output values. At step 455, the shift and saturate circuit 235 applies a shift and saturate operation to the intermediate output values in order to generate shifted and saturated intermediate output values. The further permute circuitry 240 then performs a further permute operation in order to permute the output values provided by the shift and saturate circuit 235 in order to generate N output values. At this point, the N output values will represent the bit exact transform of the N input values. The actual permutation performed by the further permute circuitry 240 will be dependent on whether an FDCT or an IDCT is being performed.

By using the mechanism of the above described embodiments, it has been found that the number of multiplications required for each one dimensional transform can be significantly reduced, whilst maintaining a bit exact result as required by modern video standards such as the HEVC standard. The technique may be used for encoding and decoding, and is readily scalable for varying sizes of N. In one embodiment, the total number of multiplications performed by the base circuitry 215 for each one dimensional transform is $3^{n-1}+3^{n-2}+ \ldots +9+Z$, where Z is $\leq 9$, and where $N=2^n$. The value of Z depends on the number of multiplications required to perform the single M×M discrete cosine transform, and in one specific implementation configured to operate on a 32×32 array (i.e. N=32) and where M=4, it has been found that six multiplies are required for the single 4×4 discrete cosine transform (i.e. Z=6). From the above equation, this results in 123 multiplies being required, this being approximately a third of the number of multiplies that would be required by the known partial butterfly approach.

The number of the iterations of the LM matrix required can be derived directly from the above equation. In particular, for the example where M is equal to 4, and accordingly multiple iterations of an L4 matrix multiplication are performed by the base circuitry, then nine multiplications are required to implement each L4 matrix multiplication. If N is 32, when as discussed earlier 123 multiplies are required, this including six multiplies required to perform the single 4×4 discrete cosine transform. Hence, 117 multiplies are required to implement the multiplications of the L4 matrix multiplication, and in particular there will be 13 iterations of the L4 matrix, each requiring nine multiplications.

The following additional information is provided relating to a specific embodiment.

Inverse Transform Algorithm Description

This section describes how to calculate the operations required for an N-point inverse discrete cosine transform where the number of points N is a power of two. The projections are first defined:

$$p_N(2nN+r) = \begin{cases} r & \text{if } 0 \leq r < N \\ 2N-r & \text{if } N \leq r < 2N \end{cases}$$

$$s_N(4nN+r) = \begin{cases} +1 & \text{if } 0 \leq r < N \text{ or } 3N < r < 4N \\ 0 & \text{if } r = N \text{ or } r = 3N \\ -1 & \text{if } N < r < 3N \end{cases}$$

Then the N-point inverse discrete cosine transformation $T_N(c_0, \ldots, c_{N-1})$ can be defined by the matrix with elements at row i, column j given by:

$$T_N = [s_N((2i+1)j)c(p_N((2i+1)j))]_{i,j}$$

In practice the coefficients $c_i$ are scaled integral or fractional estimates of $c(k)=\cos(k\pi/2N)$, but no reliance is made on the coefficients having specific values, only that the matrix has the above form. The following matrices show $T_N$ for small N.

$$T_2 = \begin{pmatrix} c_0 & c_1 \\ c_0 & -c_1 \end{pmatrix},$$

$$T_4 = \begin{pmatrix} c_0 & c_1 & c_2 & c_3 \\ c_0 & c_3 & -c_2 & -c_1 \\ c_0 & -c_3 & -c_2 & c_1 \\ c_0 & -c_1 & c_2 & -c_3 \end{pmatrix},$$

$$T_8 = \begin{pmatrix} c_0 & c_1 & c_2 & c_3 & c_4 & c_5 & c_6 & c_7 \\ c_0 & c_3 & c_6 & -c_7 & -c_4 & -c_1 & -c_2 & -c_5 \\ c_0 & c_5 & -c_6 & -c_1 & -c_4 & c_7 & c_2 & c_3 \\ c_0 & c_7 & -c_2 & -c_5 & c_4 & c_3 & -c_6 & -c_1 \\ c_0 & -c_7 & -c_2 & c_5 & c_4 & -c_3 & -c_6 & c_1 \\ c_0 & -c_5 & -c_6 & c_1 & -c_4 & -c_7 & c_2 & -c_3 \\ c_0 & -c_3 & c_6 & c_7 & -c_4 & c_1 & -c_2 & c_5 \\ c_0 & -c_1 & c_2 & -c_3 & c_4 & -c_5 & c_6 & -c_7 \end{pmatrix}$$

The input vector x and output vector y are related by the equation $y=T_N x$.

The following is then further defined:

$q_N(k) = p_{2N}(3^k)$ This is an odd value between 1 and $2N-1$. (Eq 1)

$t_N(k) = s_{2N}(3^k)$ (Eq 2)

Two permutations, $P_N$ and $Q_N$, are defined by:

$$P_N x = \begin{pmatrix} x(0), \\ t_1(0)x\left(\frac{N}{2}q_1(0)\right), \\ t_2(0)x\left(\frac{N}{4}q_2(0)\right), t_2(1)x\left(\frac{N}{4}q_2(1)\right), \\ t_4(0)x\left(\frac{N}{8}q_4(0)\right), \ldots, t_4(3)x\left(\frac{N}{8}q_4(3)\right), \\ t_{\frac{N}{2}}(0)x\left(q_{\frac{N}{2}}(0)\right), \ldots, t_{N-2}\left(\frac{N}{2}-1\right)x\left(q_{\frac{N}{2}}\left(\frac{N}{2}-1\right)\right) \end{pmatrix}$$ (Eq 3)

$$Q_N y = \\ (y((q_N(0)-1)/2), y((q_N(1)-1)/2), \ldots, y((q_N(N-1)-1)/2))$$ (Eq 4)

The permutation $P_N$ is a signed permutation to a linear vector (the description is split over multiple rows to make the pattern clear). The permutation $Q_N$ is a reordering of the values without change of sign.

Permuting the input output and coefficient values, $\tilde{x}=P_N x$, $\tilde{c}=P_N c$, $\tilde{y}=Q_N y$ gives a new permuted transform $\tilde{T}_N$ such that $\tilde{y} = \tilde{T}_N(\tilde{c}_0, \ldots, \tilde{c}_{N-1}) \tilde{x}$. If the Henkel matrix is further defined:

$$L_N(c_0, \ldots, c_{2N-1}) = \begin{pmatrix} c_0 & c_1 & \cdots & c_{N-1} \\ c_1 & & c_{N-1} & \vdots \\ \vdots & c_{N-1} & & c_{2N-3} \\ c_{N-1} & \cdots & c_{2N-3} & c_{2N-2} \end{pmatrix}$$

Then the first relation (R1) is:

$$\tilde{T}_N(\tilde{c}_0, \ldots, \tilde{c}_{N-1}) = \\ \begin{pmatrix} 1 & 1 \\ 1 & -1 \end{pmatrix} \begin{pmatrix} \tilde{T}_{\frac{N}{2}}(\tilde{c}_0, \ldots, \tilde{c}_{N/2-1}) & 0 \\ 0 & L_{\frac{N}{2}}\left(\tilde{c}_{\frac{N}{2}}, \ldots, \tilde{c}_{N-1}, -\tilde{c}_{\frac{N}{2}}, \ldots, -\tilde{c}_{N-1}\right) \end{pmatrix}$$

The second relation (R2) is:

$$L_{2N}(c_0, \ldots, c_{4N-1}) = \\ \begin{pmatrix} L_N(c_0, \ldots, c_{2N-1}) & L_N(c_N, \ldots, c_{3N-1}) \\ L_N(c_N, \ldots, c_{3N-1}) & L_N(c_{2N}, \ldots, c_{4N-1}) \end{pmatrix} = \begin{pmatrix} 1 & 0 & 1 \\ 0 & 1 & 1 \end{pmatrix}$$

$$\begin{pmatrix} L_N\begin{pmatrix}(c_0-c_N), \ldots, \\ c_{2N-1}-c_{3N-1}\end{pmatrix} & 0 & 0 \\ 0 & L_N\begin{pmatrix}(c_{2N}-c_N), \ldots, \\ c_{4N-1}-c_{3N-1}\end{pmatrix} & 0 \\ 0 & 0 & L_N\begin{pmatrix}(c_N, \ldots, \\ c_{3N-1})\end{pmatrix} \end{pmatrix} \begin{pmatrix} 1 & 0 \\ 0 & 1 \\ 1 & 1 \end{pmatrix}$$

Relation (R1) reduces $\tilde{T}_N$ to $\tilde{T}_{N/2}$ and $L_{N/2}$ followed by N additions and subtractions.

Relation (R2) reduces $L_N$ to N/2 additions followed by three multiplications by $L_{N/2}$, followed by N additions. This does not include the coefficient subtractions, but the coefficients are assumed to be fixed and the subtracted coefficient values can be calculated in advance.

For $N=2^n \geq 8$, repeating relations (R1) and (R2) recursively reduces $\tilde{T}_N$ to additions, followed by one multiplication by $\tilde{T}_4$ and $(3^{n-3}+\ldots+1)$ multiplications by matrices of the form $L_4$ followed by additions and subtractions.

Inverse Transform Example

This section illustrates how to apply the theory of the previous section to the practical case of N=16.

Starting with input vector $x=(x_0, x_1, x_2, x_3, x_4, x_5, x_6, x_7, x_8, x_9, x_{10}, x_{11}, x_{12}, x_{13}, x_{14}, x_{15})$, this is permuted to $\tilde{x}=(x_0, x_8, x_4, x_{12}, x_2, x_6, -x_{14}, x_{10}, x_1, x_3, x_9, -x_5, -x_{15}, x_{13}, x_7, x_{11})$.

The permuted vector is split into 4 groups or vectors of 4 elements each:

$X_0=(x_0, x_8, x_4, x_{12})$, $X_1=(x_2, x_6, -x_{14}, x_{10})$, $X_2=(x_1, x_3, x_9, -x_5)$, $X_3=(-x_{15}, x_{13}, x_7, x_{11})$

In a similar way the coefficients are permuted and grouped:
$C_0=(c_0, c_8, c_4, c_{12})$, $C_1=(c_2, c_6, -c_{14}, c_{10})$, $C_2=(c_1, c_3, c_9, -c_5)$, $C_3=(-c_{15}, c_{13}, c_7, c_{11})$ The output vector is split into four permuted groups:
$Y_0=(y_0, y_1, y_4, y_{13})$, $Y_1=(y_8, y_6, y_{12}, y_5)$, $Y_2=(y_{15}, y_{14}, y_{11}, y_2)$, $Y_3=(y_7, y_9, y_3, y_{10})$ Applying relation R1 gives the equations:

$$Y_0 = W_0 + W_2, Y_1 = W_1 + W_3, Y_2 = W_0 - W_2, Y_3 = W_1 - W_3$$

$$\begin{pmatrix} W_0 \\ W_1 \end{pmatrix} = \tilde{T}_8(C_0, C_1)\begin{pmatrix} X_0 \\ X_1 \end{pmatrix}, \begin{pmatrix} W_2 \\ W_3 \end{pmatrix} = L_8(C_2, C_3, -C_2, -C_3)\begin{pmatrix} X_2 \\ X_3 \end{pmatrix}$$

Applying relation R1 and R2 gives the equations:

$$W_0 = W'_0 + W'_1, W_1 = W'_0 - W'_1, W_2 = W'_2 + W_3 = W'_3 + W'_4$$

$$W'_0 = \tilde{T}_4(C_0)X_0, W'_1 = L_4(C_1, -C_1)X_1$$

$$W'_2 = L_4(C_2 - C_3, C_3 + C_2)X_2, W'_3 = L_4(-C_2 - C_3, -C_3 + C_2)X_3,$$

$$W'_4 = L_4(C_3 - C_2)(X_2 + X_3)$$

This reduces the transform to one $\tilde{T}_4$ and four $L_4$ operations.

Forward Transform Algorithm Description

The N-point forward discrete cosine transformation $F_N(c_0, \ldots, c_{N-1}) = NT_N^{-1}$ can be defined by the matrix with elements at row i, column j given by:

$$F_N = [s_N((2j1)i)c(p_N((2j+1)i))]_{i,j}$$

Defining $\tilde{F} = N\tilde{T}_N^{-1}$, swapping the input and output permutations, and inverting relation (R1), the relation (R3) below is obtained:

$$\tilde{F}_N(\tilde{c}_0, \ldots, \tilde{c}_{N-1}) = \begin{pmatrix} \tilde{F}_{\frac{N}{2}}(\tilde{c}_0, \ldots, \tilde{c}_{N/2-1}) & 0 \\ 0 & L_{\frac{N}{2}}(\tilde{c}_{\frac{N}{2}}, \ldots, \tilde{c}_{N-1}, -\tilde{c}_{\frac{N}{2}}, \ldots, -\tilde{c}_{N-1}) \end{pmatrix}\begin{pmatrix} 1 & 1 \\ 1 & -1 \end{pmatrix}$$

For $N=2^n \geq 8$, repeating relations (R3) and (R2) recursively reduces $\tilde{F}_N$ to additions and subtractions, followed by one multiplication by $\tilde{F}_4$ and $(3^{n-3}+ \ldots +1)$ multiplications by matrices of the form $L_4$ followed by additions. The relations can be applied in a similar way to the inverse transform example.

Example Implementation

The following example C code implements the inverse transform $T_N$ and the forward transform $F_N$ in the functions fact_idct_1d_i16( ) and fact_fdct_1d_i16 ( ) respectively.

```
/* Calculate projection p()
 *
 *   p(2*k*n+r) = r        if 0<=r<n
 *                2*n-r    if n<=r<2*n
 */ static unsigned int p_n(unsigned int k, unsigned int n)
```

```
{
    k = k % (2*n);
    if (k>=n)
    {
        k = 2*n-k;
    }
    return k;
}

/* Calculate sign s()
 *
 *   s(4*k*n+r) = +1     if 0<=r<n or 3*n<r<4*n
 *                 0     if r==n or r==3*n
 *                -1     if n<r<2*n
 */ static int s_n(unsigned int k, unsigned int n)
{
    int s=+1;
    k = k % (4*n);
    if (k==n || k==3*n)
    {
        s = 0;
    }
    else if (k>=n && k<3*n)
    {
        s=-1;
    }
    return s;
}

/* Linear correlation
 *
 * y[i] = x[0]*c[i] + ... + x[n-1]*c[i+n-1]
 *
 * The nxn correlation is broken down into 4x4 operations by recursion.
 */ static void L_n(
```

```
        int32_t *y,              // output (n elements)
        const int32_t *x,        // input  (n elements)
        const int32_t *c,        // coefficients (2*n-1 elements)
        unsigned int n           // size
)
{
    assert(n>=4);
    if (n==4)
    {
        /* Implement L4 in 9 mutliplies
         * The coefficients can be pre-calculated
         */
        int32_t v0 = (x[0]+x[1])*(c[1]-c[3]);
        int32_t v1 = (x[2]+x[3])*(c[5]-c[3]);
        int32_t v2 = (x[0]+x[1]+x[2]+x[3])*c[3];
        int32_t w0 = v0 + v2;
        int32_t w1 = v1 + v2;
        v0 = x[0]*((c[0]-c[2])-(c[1]-c[3]));
        v1 = x[2]*((c[4]-c[2])-(c[5]-c[3]));
        v2 = (x[0]+x[2])*(c[2]-c[3]);
        y[0] = w0 + v0 + v2;
        y[2] = w1 + v1 + v2;
        v0 = x[1]*((c[2]-c[4])-(c[1]-c[3]));
        v1 = x[3]*((c[6]-c[4])-(c[5]-c[3]));
        v2 = (x[1]+x[3])*(c[4]-c[3]);
        y[1] = w0 + v0 + v2;
        y[3] = w1 + v1 + v2;
    }
    else /* n>4 */
    {
        int32_t x2[MAX_ITRANS_SIZE/4];
        int32_t c0[MAX_ITRANS_SIZE/2];
        int32_t c1[MAX_ITRANS_SIZE/2];
        int32_t y2[MAX_ITRANS_SIZE/4];
        unsigned int i;
        unsigned int n2=n>>1;

/* Additions subtractions before recursion */
        for (i=0; i<n2; i++)
```

```
        {
            x2[i] = x[i] + x[n2+i];
        }

/* Coefficients can be pre-calculated */
        for (i=0; i<n-1; i++)
        {
            c0[i] = c[i]   - c[n2+i];
            c1[i] = c[n+i] - c[n2+i];
        }

/* Recurse */
        L_n(y2,    x2,    c+n2, n2);   // L4 on x[i]+x[(n/2)+i]
        L_n(y,     x,     c0,   n2);   // L4 on x[i]
        L_n(y+n2,  x+n2,  c1,   n2);   // L4 on x[(n/2)+i]

/* Further additions/subtractions after recursion */
        for (i=0; i<n2; i++)
        {
            y[i]    = y[i]    + y2[i];
            y[n2+i] = y[n2+i] + y2[i];
        }
    }
}

/* Caluclate matrix T~_n(c) with permuted input and output */ static void TT_n(
    int32_t *y,               // output
    const int32_t *x,         // input
    const int32_t *c,         // coefficients
    unsigned int n            // size
)
{
    /* Factorized version */
    assert(n>=4);
    if (n==4)
    {
        /* 4-point IDCT in 6 multiplies */
```

```
        int32_t v0,v1,v2;
        assert(c[0]==c[1]);
        v0 = x[2]*c[2];
        v1 = x[3]*c[3];
        v2 = (x[0]+x[1])*c[0];
        y[0] = v2+v0+v1;
        y[2] = v2-v0-v1;
        v0 = x[2]*c[3];
        v1 = x[3]*c[2];
        v2 = (x[0]-x[1])*c[0];
        y[1] = v2+v0-v1;
        y[3] = v2-v0+v1;
    }
    else /* n>4 */
    {
        int32_t c1[MAX_ITRANS_SIZE];    // expanded correlation
        unsigned int i;
        unsigned int n2 = n>>1;

/* Coefficients can be pre-calculated */
        for (i=0; i<n2; i++)
        {
            c1[i]    = c[n2+i];
            c1[n2+i] = -c1[i];
        }

/* Recurse */
        TT_n(y, x, c, n2);
        L_n(y+n2, x+n2, c1, n2);

/* Further additions/subtractions after recursion */
        for (i=0; i<n2; i++)
        {
            int32_t y0 = y[i];
            int32_t y1 = y[i+n2];
            y[i]    = y0+y1;
            y[i+n2] = y0-y1;
        }
    }
}
```

```c
}

/* Caluclate matrix F~_n(c) with permuted input and output */ static void FF_n(
    int32_t *y,                 // output
    int32_t *x,                 // input (modified by butterflies)
    const int32_t *c,           // coefficients
    unsigned int n              // size
)
{
    /* Factorized version */
    assert(n>=4);
    if (n==4)
    {
        /* 4-point FDCT in 6 multiplies */
        int32_t v0,v1,v2;
        assert(c[0]==c[1]);
        v0 = (x[0]-x[2])*c[2];
        v1 = (x[1]-x[3])*c[3];
        v2 = (x[0]+x[1]+x[2]+x[3])*c[0];
        y[0] = v2;
        y[2] = v0+v1;
        v0 = (x[0]-x[2])*c[3];
        v1 = (x[1]-x[3])*c[2];
        v2 = (x[0]-x[1]+x[2]-x[3])*c[0];
        y[1] = v2;
        y[3] = v0-v1;
    }
    else /* n>4 */
    {
        int32_t c1[MAX_ITRANS_SIZE];    // expanded correlation
        unsigned int i;
        unsigned int n2 = n>>1;

/* Coefficients can be pre-calculated */
        for (i=0; i<n2; i++)
        {
            c1[i]    = c[n2+i];
```

```
            c1[n2+i] = -c1[i];
        }

/* Additions subtractions before recursion */
        for (i=0; i<n2; i++)
        {
            int32_t x0 = x[i];
            int32_t x1 = x[i+n2];
            x[i]    = x0+x1;
            x[i+n2] = x0-x1;
        }

/* Recurse */
        FF_n(y, x, c, n2);
        L_n(y+n2, x+n2, c1, n2);
    }
}

/* Factorized 1D linear integer IDCT */ void fact_idct_1d_i16
(
    int16_t *y,             // Output
    const int16_t *x,       // Input
    const int16_t *c,       // Coefficients
    unsigned int n,         // Size
    unsigned int shift,     // right shift
    int32_t R               // round
)
{
    int32_t Y[MAX_ITRANS_SIZE];
    int32_t X[MAX_ITRANS_SIZE];
    int32_t C[MAX_ITRANS_SIZE];
    unsigned int i;
    unsigned int k;
    unsigned int m;
    unsigned int q;
    unsigned int p;
    int s;
```

```
    /* Apply input signed permutation */
    X[0] = x[0];
    C[0] = c[0];
    m = n/2;
    for (k=1; k<n; k=k<<1, m=m>>1)
    {
        q = 1;
        for (i=0; i<k; i++)
        {
            p = m*p_n(q, 2*k);
            s = s_n(q, 2*k);
            X[k+i] = (s>0) ? x[p] : -x[p];
            C[k+i] = (s>0) ? c[p] : -c[p];
            q = (q*3) % (8*n);
        }
    }

/* Calculate permuted transform T~_n */
    TT_n(Y,X,C,n);   // note X and Y are modified /* Apply output (unsigned) permutation */
    q = 1;
    for (i=0; i<n; i++)
    {
        p = p_n(q, 2*n) >> 1;
        y[p] = (Y[i] + R) >> shift;
        q = (q*3) % (8*n);
    }
}

/* Factorized 1D linear integer FDCT */ void fact_fdct_1d_i16
(
    int16_t *y,             // Output
    const int16_t *x,       // Input
    const int16_t *c,       // coefficients
    unsigned int n,         // size
```

```
    unsigned int shift,     // right shift
    int32_t R               // round
)
{
    int32_t Y[MAX_ITRANS_SIZE];
    int32_t X[MAX_ITRANS_SIZE];
    int32_t C[MAX_ITRANS_SIZE];
    unsigned int i;
    unsigned int k;
    unsigned int m;
    unsigned int q;
    unsigned int p;
    int s;

/* Apply input (unsigned) permutation */
    q = 1;
    for (i=0; i<n; i++)
    {
        p = p_n(q, 2*n) >> 1;
        X[i] = x[p];
        q = (q*3) % (8*n);
    }

/* Apply coefficient signed permutation */
    C[0] = c[0];
    m = n/2;
    for (k=1; k<n; k=k<<1, m=m>>1)
    {
        q = 1;
        for (i=0; i<k; i++)
        {
            p = m*p_n(q, 2*k);
            s = s_n(q, 2*k);
            C[k+i] = (s>0) ? c[p] : -c[p];
            q = (q*3) % (8*n);
        }
    }

/* Calculate permuted transform F~_n */
```

```
FF_n(Y,X,C,n);

/* Apply output signed permutation */
y[0] = (Y[0]+R)>>shift;
m = n/2;
for (k=1; k<n; k=k<<1, m=m>>1)
{
    q = 1;
    for (i=0; i<k; i++)
    {
        p = m*p_n(q, 2*k);
        s = s_n(q, 2*k);
        int32_t yy = (s>0) ? Y[k+i] : -Y[k+i];
        y[p] = (yy+R)>>shift;
        q = (q*3) % (8*n);
    }
}
}
```

From the above described embodiments, it will be appreciated that such embodiments provide a scalable mechanism for performing both forward and inverse transforms for varying sizes of N, which result in a significant reduction in the number of multiplications required in order to perform the transform, and which produces a bit exact result.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

The invention claimed is:

1. A data processing apparatus for performing a transform between spatial and frequency domains when processing video data, the data processing apparatus comprising:

transform circuitry configured to receive N input values and to perform a sequence of operations to generate N output values representing the transform of said N input values between the spatial and frequency domains;

a base circuitry configured to receive M internal input values generated by the transform circuitry, where M is greater than or equal to 4, and to perform a base operation equivalent to matrix multiplication of said M internal input values by a matrix comprising an array of coefficients c and having the form $$\begin{matrix} c_0 & c_1 & c_2 & \ldots & c_{M-1} \\ c_1 & c_2 & c_3 & \ldots & c_M \\ c_2 & c_3 & c_4 & \ldots & c_{M+1} \\ \ldots & & & & \\ c_{M-1} & c_M & c_{M+1} & \ldots & c_{2M-2} \end{matrix}$$

in order to generate M internal output values for returning to the transform circuitry; and the transform circuitry being arranged during performance of said sequence of operations to generate from the N input values multiple sets of said M internal input values, to provide each set of M internal input values to the base circuitry in order to cause multiple sets of said M internal output values to be produced, and to derive the N output values from said multiple sets of M internal output values.

2. A data processing apparatus as claimed in claim 1, wherein:

said matrix comprising an array of coefficients c is a Hankel matrix; and the base circuitry is configured to perform said base operation equivalent to matrix multiplication of said M internal input values by said Hankel matrix irrespective of the values allocated to the coefficients $c_0$ to $c_{2M-2}$.

3. A data processing apparatus as claimed in claim 1, wherein the transform performed between spatial and frequency domains is a discrete cosine transform.

4. A data processing apparatus as claimed in claim 1, wherein the transform circuitry comprises:

permutation circuitry configured to permute the received N input values in order to produce K groups of input values, where K=N/M and hence each group has M members, each member being one of said received N input values; and adder circuitry configured to perform at least one of addition and subtraction operations on corresponding members from selected groups in order to generate each set of said M internal input values.

5. A data processing apparatus as claimed in claim 4, wherein the transform circuitry further comprises:

further adder circuitry configured to perform at least one of addition and subtraction operations on the multiple sets of said M internal output values produced by the base circuitry in order to produce N intermediate output values.

6. A data processing apparatus as claimed in claim 5, wherein the transform circuitry further comprises:

shift circuitry configured to perform a shift operation on the N intermediate output values in order to generate shifted intermediate output values.

7. A data processing apparatus as claimed in claim 6 wherein said shift operation includes a saturate operation.

8. A data processing apparatus as claimed in claim 6, wherein the transform circuitry further comprises:

further permutation circuitry configured to permute the N shifted intermediate output values in order to generate said N output values.

9. A data processing apparatus as claimed in claim 1, further comprising coefficient generation circuitry configured to generate for each set of M internal input values a corresponding set of coefficient values to be used by the base circuitry when performing the base operation.

10. A data processing apparatus as claimed in claim 1, wherein the data processing apparatus is configurable to perform one of a forward transform from the spatial to the frequency domain and an inverse transform from the frequency to the spatial domain.

11. A data processing apparatus as claimed in claim 10, further comprising coefficient generation circuitry configured to generate for each set of M internal input values a corresponding set of coefficient values to be used by the base circuitry when performing the base operation, wherein said corresponding set of coefficient values generated by the coefficient generation circuitry for each set of M internal input values are the same irrespective of whether the data processing apparatus is configured to perform the forward transform or is configured to perform the inverse transform.

12. A data processing apparatus as claimed in claim 1, wherein the transform performed between spatial and frequency domains is a discrete cosine transform, wherein the transform circuitry is further configured to generate a further set of M internal input values for provision to the base circuitry, and the base circuitry is configured to perform a discrete cosine transform on said further set of M internal input values by performing a discrete cosine transform operation equivalent to matrix multiplication of said further set of M internal input values by a discrete cosine transform matrix.

13. A data processing apparatus as claimed in claim 12, wherein said data processing apparatus is configured to perform a forward discrete cosine transform during encoding of the video data, and the base circuitry is configured to perform as the discrete cosine transform operation a forward discrete transform operation following performance of the base operation on said multiple sets of M internal input values.

14. A data processing apparatus as claimed in claim 12, wherein said data processing apparatus is configured to perform an inverse discrete cosine transform during decoding of the video data, and the base circuitry is configured to perform as the discrete cosine transform operation an inverse discrete transform operation prior to performance of the base operation on said multiple sets of M internal input values.

15. A data processing apparatus as claimed in claim 1, wherein N is a multiple of M.

16. A data processing apparatus as claimed in claim 15, wherein N is a power of 2.

17. A data processing apparatus as claimed in claim 1, wherein M=4.

18. A data processing apparatus as claimed in claim 1, wherein the transform circuitry comprises:
   permutation circuitry configured to permute the received N input values in order to produce K groups of input values, where K=N/M and hence each group has M members, each member being one of said received N input values; and
   adder circuitry configured to perform at least one of addition and subtraction operations on corresponding members from selected groups in order to generate each set of said M internal input values, wherein said adder circuitry is configured as SIMD circuitry providing M lanes of parallel processing for performing said at least one of addition and subtraction operations in parallel in order to generate each set of said M internal input values.

19. A data processing apparatus as claimed in claim 1, wherein the transform circuitry comprises:
   permutation circuitry configured to permute the received N input values in order to produce K groups of input values, where K=N/M and hence each group has M members, each member being one of said received N input values; and
   adder circuitry configured to perform at least one of addition and subtraction operations on corresponding members from selected groups in order to generate each set of said M internal input values; and
   further adder circuitry configured to perform at least one of addition and subtraction operations on the multiple sets of said M internal output values produced by the base circuitry in order to produce N intermediate output values;
   wherein said further adder circuitry is configured as SIMD circuitry providing M lanes of parallel processing for performing said at least one of addition and subtraction operations in parallel on each set of said M internal output values produced by the base circuitry.

20. A data processing apparatus as claimed in claim 1, wherein:
   the data processing apparatus is configured to operate on video data blocks comprising an N×N array of data values by separately performing, on each row and each column of N data values, said transform between the spatial and frequency domains; and
   the total number of multiplications performed by said base circuitry for each said row or each said column is $3^{n-1}+3^{n-2}+\ldots+9+Z$, where Z is $\leq 9$, and where $N=2^n$.

21. A data processing apparatus as claimed in claim 1, further comprising coefficient generation circuitry configured to generate for each set of M internal input values a corresponding set of coefficient values to be used by the base circuitry when performing the base operation, wherein said data processing apparatus is configurable to support different video Standards by causing the coefficient generation circuitry to set the corresponding set of the coefficients supplied to the base circuitry for each set of M internal input values dependent on a currently selected video Standard.

22. A method of performing a transform between spatial and frequency domains when processing video data, the method comprising:
   employing transform circuitry to receive N input values and to perform a sequence of operations to generate N output values representing the transform of said N input values between the spatial and frequency domains;
   employing a base circuitry to receive M internal input values generated by the transform circuitry, where M is greater than or equal to 4, and to perform a base operation equivalent to matrix multiplication of said M internal input values by a matrix comprising an array of coefficients c and having the form $$\begin{array}{ccccc} c_0 & c_1 & c_2 & \ldots & c_{M-1} \\ c_1 & c_2 & c_3 & \ldots & c_M \\ c_2 & c_3 & c_4 & \ldots & c_{M+1} \\ \ldots & & & & \\ c_{M-1} & c_M & c_{M+1} & \ldots & c_{2M-2} \end{array}$$

in order to generate M internal output values for returning to the transform circuitry; and
   performance of said sequence of operations by the transform circuitry comprising:
      generating from the N input values multiple sets of said M internal input values;
      providing each set of M internal input values to the base circuitry in order to cause multiple sets of said M internal output values to be produced; and
      deriving the N output values from said multiple sets of M internal output values.

23. A data processing apparatus for performing a transform between spatial and frequency domains when processing video data, the data processing apparatus comprising:
   transform means for receiving N input values and for performing a sequence of operations to generate N output values representing the transform of said N input values between the spatial and frequency domains;
   base circuitry means for receiving M internal input values generated by the transform means, where M is greater than or equal to 4, and for performing a base operation equivalent to matrix multiplication of said M internal input values by a matrix comprising an array of coefficients c and having the form $$\begin{array}{ccccc} c_0 & c_1 & c_2 & \ldots & c_{M-1} \\ c_1 & c_2 & c_3 & \ldots & c_M \\ c_2 & c_3 & c_4 & \ldots & c_{M+1} \\ \ldots & & & & \\ c_{M-1} & c_M & c_{M+1} & \ldots & c_{2M-2} \end{array}$$

in order to generate M internal output values for returning to the transform means; and
   the transform means, during performance of said sequence of operations, for generating from the N input values multiple sets of said M internal input values, for providing each set of M internal input values to the base circuitry means in order to cause multiple sets of said M internal output values to be produced, and for deriving the N output values from said multiple sets of M internal output values.

* * * * *